United States Patent [19]

Larson et al.

[11] 4,398,930
[45] Aug. 16, 1983

[54] FLUID DEAERATION APPARATUS

[75] Inventors: Larry A. Larson, Washington; Brian J. Murphy, Morton, both of Ill.

[73] Assignee: Caterpillar Tractor Co., Peoria, Ill.

[21] Appl. No.: 297,529

[22] PCT Filed: Aug. 7, 1981

[86] PCT No.: PCT/US81/01056

§ 371 Date: Aug. 7, 1981

§ 102(e) Date: Aug. 7, 1981

[51] Int. Cl.³ .............................................. B01D 19/00
[52] U.S. Cl. ........................................ 55/192; 55/182; 55/201
[58] Field of Search ...................... 55/52, 55, 171, 182, 55/185, 186, 189–194, 201, 277, 202, 206

[56] References Cited

U.S. PATENT DOCUMENTS

| | | | |
|---|---|---|---|
| 1,255,395 | 2/1918 | Duram | 55/201 |
| 2,151,644 | 3/1939 | Stephens | 55/55 X |
| 2,277,100 | 3/1942 | Hartmann | 55/201 |
| 2,586,671 | 2/1952 | Landis | 55/206 X |
| 2,614,656 | 10/1952 | Clark et al. | 55/55 |
| 2,695,679 | 11/1954 | Hoffman et al. | 55/202 X |
| 2,748,884 | 6/1956 | Erwin | 55/193 |
| 2,773,555 | 12/1956 | Pape | 55/193 |
| 2,962,863 | 12/1960 | Caroli | 55/190 X |
| 2,990,030 | 6/1961 | McCoy et al. | 55/55 X |
| 3,112,191 | 11/1963 | Anderson | 55/194 |
| 3,638,760 | 2/1972 | Lamm | 55/277 X |
| 3,750,463 | 8/1973 | Erwin, Jr. | 73/113 |
| 3,813,851 | 6/1974 | Eder | 55/52 |
| 3,817,273 | 6/1974 | Erwin, Jr. | 137/338 |

FOREIGN PATENT DOCUMENTS

| | | | |
|---|---|---|---|
| 224106 | 7/1910 | Fed. Rep. of Germany | 55/206 |
| 1936350 | 1/1970 | Fed. Rep. of Germany | 55/206 |

Primary Examiner—Robert H. Spitzer
Attorney, Agent, or Firm—Wood, Dalton, Phillips, Mason & Rowe

[57] ABSTRACT

A fluid deaeration apparatus (10) for removing gas from a circulating fluid having a closed, fluid filled tank (12) for receiving and slowing the fluid. A pressure regulating valve (52) is provided for inducing negative pressure waves in the fluid entering the tank (12) for conditioning the gas in the fluid for removal from the fluid in the tank and for collection and venting of the gas from the tank (12).

7 Claims, 3 Drawing Figures

FLUID DEAERATION APPARATUS

TECHNICAL FIELD

This invention relates generally to the deaeration of fluid and more particularly to deaeration of fluid in a fluid pressure circuit.

BACKGROUND ART

A fluid, as for example diesel fuel, in a pump circuit which comes in contact with a gas such as air often dissolves and/or entrains the air which is then transported throughout the fluid flow circuit. The entrained, compressible air in the fluid causes the normally incompressible fluid to be somewhat compressible which, in turn, may result in a miriad of problems. The problems vary from erratic volumetric efficiency of pumps to erratic readings from flow meters as both compressible and incompressible fluids flow through the circuit. Also, air pockets may form in the circuit as entrained air leaves the fluid which can result in foaming of the fluid and occasional slug flow patterns which possibly could damage equipment such as pumps.

It has been known in the prior art to provide a deaeration means in the pump circuit to remove air entrained in the fluid. It has also been known to overpressurize the fluid in order to increase the ability of a fluid to dissolve a greater amount of gas thereby reducing the amount of free gas bubbles.

One such deaeration means known to be used is an atmospheric reservoir having a top inlet and a bottom outlet, sized so as to hold the fluid long enough for the entrained air to slowly rise and pass out of the fluid. This approach somewhat alleviates the problems attending entrainment, however, the required reservoir may be prohibitively large. Additionally, the flow of fluid within the reservoir may develop flow patterns such that sufficient time is not provided to release the air. Providing a reservoir with baffles which avoid the flow patterns mentioned above is also known but the atmospheric release of entrained air requires substantially long hold up times and the reservoir itself often becomes a source of more entrainment as the fluid absorbs the air.

Another method known to deaerate fluid is to allow the incoming fluid to cascade into the reservoir over a baffle as a thin film as shown in U.S. Pat. No. 3,638,760 issued Feb. 1, 1972 to Heinz Lamm. The thin film cascading of the fluid enables the entrained air to be released from the fluid. This method may result in re-entrainment of air as the incoming fluid falls against the main body of fluid trapping air therebetween.

The present invention is directed to overcoming one or more of the problems as set forth above.

DISCLOSURE OF THE INVENTION

In one aspect of the present invention a closed tank is provided with an inlet to receive and slow the velocity of fluid, an outlet to pass the fluid disentrained of gas out of the tank, and a vent for exhausting the gas which has been liberated from the fluid. A pressure regulating value means adjacent to the fluid inlet, induces negative pressure waves in the fluid which cause dissolved gas to dissociate and combine to form the larger bubbles of entrained gas. As the fluid, now carrying entrained gas, enters the tank, the fluid flow velocity is reduced thereby giving the bubbles of entrained gas an opportunity to rise, collect and be exhausted before the bubbles can break up and redissolve.

BEST MODE FOR CARRYING OUT THE INVENTION

Turning to the drawings an embodiment of a fluid deaeration apparatus 10 of this invention is shown. A typical use of the deaeration apparatus 10 is in a closed fluid circulating circuit, shown schematically in FIG. 1, such as a circuit which tests diesel fuel injection pumps wherein the fluid is circulated by a circulating pump 11. The circulating pump 11 discharges the fluid containing entrained and dissolved air which is routed to various demand points shown generally as P and as an injector pump 13 and then is returned to the input side of the circulating pump 11. It has been found that for best results, the circulating pump 11 be capacity oversized with respect to demand and that the excess capacity be recirculated from the circulating pump 11 discharge through the deaeration apparatus 10 returning to the input or suction side of the circulating pump 11. Further, it has been found advantageous to size the circuit such that fluid velocity is high enough to sweep air bubbles within the circuit back to the circulating pump 11 and ultimately to the deaeration apparatus 10. In the above manner, given continuous recirculation through the deaeration apparatus 10, substantially all the fluid passes through and is relieved of entrained air by the deaeration apparatus 10.

A fluid contains air in essentially two forms. The first form, entrained air, appears as small and large air bubbles which are swept along with a moving fluid. If fluid velocity is reduced these bubbles of entrained air will quickly rise and eventually percolate from the fluid. The second form of air, dissolved air, appears as very small bubbles of air held within the fluid. Reducing flow velocity will not relieve the fluid of its dissolved air.

It has been found that dissolved air in a fluid can be caused to dissociate and combine to form bubbles of entrained air. The throttling action of a valve creates more fluid flow when the valve opens and less as the valve closes. This changing of fluid flow creates a change in momentum resulting in a negative pressure at the exit of the valve. The negative pressure in turn causes the dissolved gas, such as air, to rapidly dissociate to form bubbles of entrained air. Given enough time the entrained air bubbles could redissolve if the fluid is not already saturated with air. It should be noted that the rate at which entrained air is redissolved is slower than the rate of dissociation, in other words, hysteresis effect exists. Therefore, if upon dissociation of dissolved air, the flow of fluid can be slowed to allow the resultant bubbles of entrained air to rise and disentrain before redissolving, the dissolved air can thus be partially removed leaving behind a deaerated fluid undersaturated with air.

Figure 1:
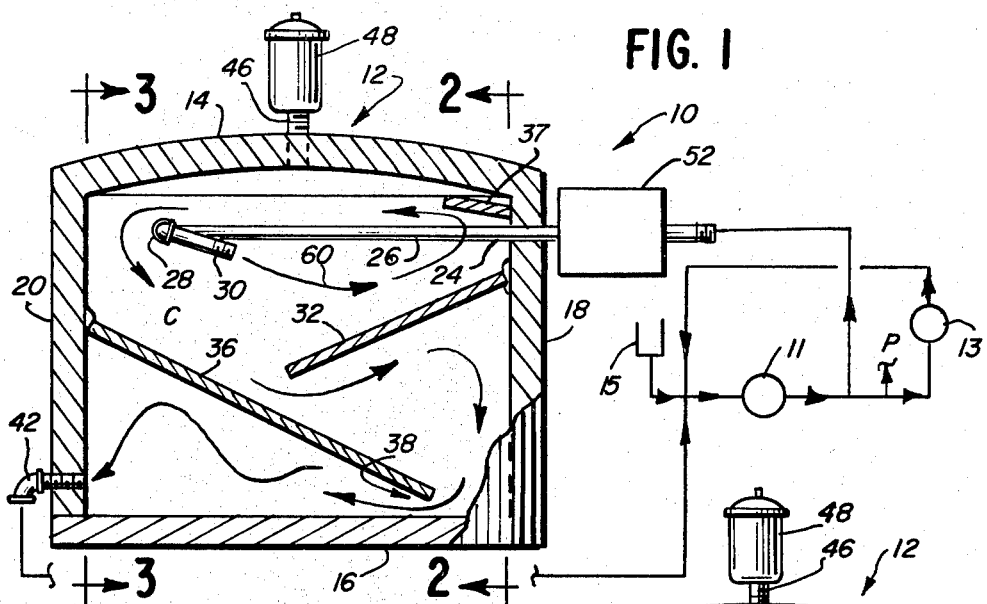
FIG. 1 shows the fuel deaeration apparatus of an embodiment of the present invention.
Figure 2:
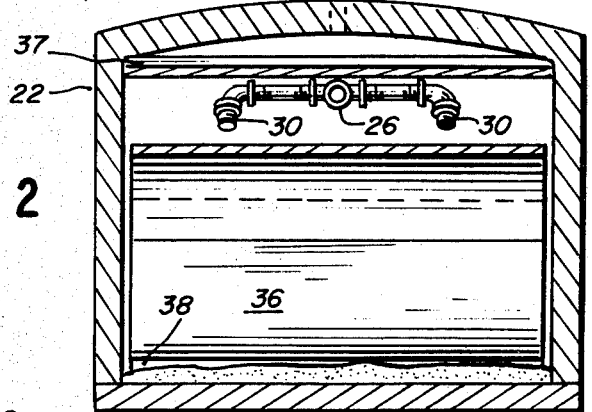
FIG. 2 is a view of the fuel deaeration apparatus of FIG. 1 taken along line 2—2.
Figure 3:
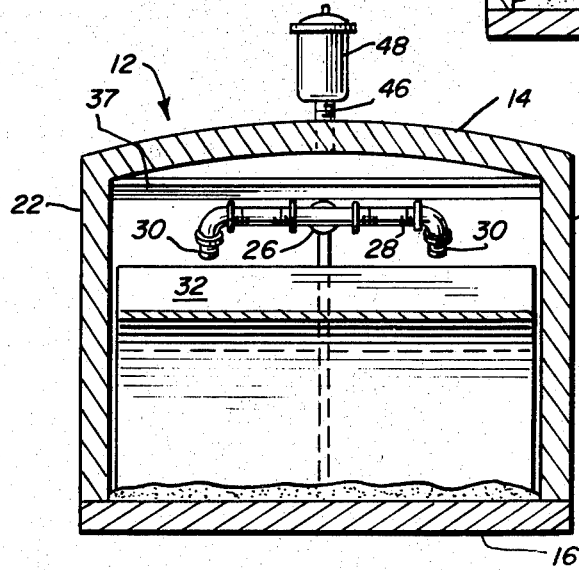
FIG. 3 is a view of the fuel deaeration apparatus taken along line 3—3 of FIG. 1.

To provide the aforementioned slowing of the fluid, the deaeration apparatus 10, as shown in FIGS. 1-3, has a fluid filled deaeration pressure tank 12. The tank 12 receives fluid at approximately the suction pressure of the pump 11. Upon entering the tank 12 the fluid is slowed so that entrained air bubbles can be liberated from the fluid in a manner described below. To accomplish the foregoing the tank 12 has a shaped top 14 and a bottom 16, an inlet side 18 and an outlet side 20 with the two remaining sides being shown as sidewalls 22 all of which combine to define the interior C of the tank 12. While the tank 12 is shown in the drawings as being cubical, other configurations may equally perform the functions hereinafter described.

Through an inlet bore 24 disposed near the top of the inlet side 18 passes a submerged fluid carrying inlet tubing 26. By known means, any space between the inlet bore 24 and the tubing 26 is sealed to prevent fluid within interior C from escaping the tank 12. As best shown in FIG. 1 the inlet tubing 26 extends, near the top 14, into the interior C where its end is connected to a header 28 which splits the fluid flow into multiple streams to slow its velocity. As seen in FIGS. 2 and 3, the header 28 medially receives the tubing 26 and extends between the sidewalls 22. At each end of the header 28 is a nozzle 30 which serves as a means to direct each stream.

To provide a collecting surface for the air bubbles, the top 14 of the tank 12 is tapered as by having a dome-shaped construction. Bubbles rising to the top 14 will collect, coalesce, and migrate to the high point of the top 14 facilitating the removal of air from the tank 12. Extending through and sealed to the top 14 to communicate with the apex of the top 14 is a vent pipe 46 which carries the collected air out of the tank 12. Exterior of the tank 12, an automatic air vent device 48 of known construction is connected to the vent pipe 46. The air vent device 48 releases air while permitting the interior C of the tank 12 to remain fluid filled and under approximately the positive suction pressure of the pump 11.

Through the bottom center of the outlet side 20 is threaded and sealed an outlet tube 42. The outlet tube 42, which communicates with the suction side of the circulating pump, allows the deaerated fluid to pass from the tank 12 back to the circulating system. In that the circulating pump suction is slightly pressurized, the communication between the outlet tube 42 and the pump suction maintains the tank 12 in a fluid filled state. An elevated head tank 15 communicating with the suction of the circulating pump contributes to maintaining the tank 12 full and also determines the pump suction pressure and tank 12 pressure.

While the fluid filled tank 12 provides for the slowing of the fluid, a mechanism is required which, in effect, causes the dissolved air to dissociate and form the desired large air bubbles of entrained air in the liquid while at the same time enabling the deaerator device 10 to operate at the slightly positive pressures of the pump 11 suction. For this purpose a valving means such as a relief valve 52 is placed in the inlet tubing 26 adjacent to the tank 12.

As the previously described overcapacity of the pump 11 passes through the relief valve 52, the valve 52 opens and would, given a constant recirculation rate, reach an equilibrium position. However, since the demand for the pump 11 output fluctuates, the valve must continually throttle in attempting to maintain a constant pressure. These oscillations of the valve 52 cause more or less fluid to pass, thereby changing fluid velocity and momentum of the fluid entering the tank 12. Changing fluid momentum induces positive and negative pressure waves. The negative pressure waves momentarily creates an oversaturated air to fluid relationship which becomes unstable and results in the release of a volume of dissolved air in the form of the bubbles of entrained air. It should be noted that the relief valve 52 is placed as close as possible to the tank 12 since the bubbles of entrained air created by the negative pressure waves will once again become dissolved in the fluid if they are permitted to be intermingled with the fluid, now undersaturated with air, for too long a period of time. The shorter the spacing between the relief valve and the nozzle 30, the less likely the entrained air bubbles will become redissolved in the fluid.

Passing through the relief valve 52, the fluid with the bubbles of entrained air created by the negative pressure waves described above pass through the inlet tubing 26, divide and flow through the header 28 and are directed into the fluid filled interior C of the tank 12 by the nozzles 30. As the fluid enters the interior C, fluid velocity decreases which gives the air bubbles an opportunity to rise and collect at the top 14. As the air bubbles rise and collect the more dense fluid leaves the tank 12 free of entrained air.

If desired, a pair of submerged, cascading baffles, designated as first and second baffles 32 and 36, may be incorporated into the tank 12 as shown by the angled baffles in the drawings. Additionally a deflector 37 may be disposed within the tank 12 to assure that a region of stagnancy is created in the liquid near the top of the tank 12. The first and second baffles 32 and 36 with the deflector 37 direct the circulation of the liquid in the tank 12 in a winding fashion as illustrated by flow arrows 60 to help slow the fluid and aid the percolation and collection of air bubbles therefrom. Thereafter, the fluid passes beneath the second baffle 36 through a passageway 38 and to the outlet 42 for return to the pump 11.

Due to the effects of the fluid filled tank 12, with or without the first and second baffles 32 and 36, fluid velocity decreases substantially. The air bubbles created by the negative pressure waves, moving toward the top 14 collect at the high point. The collected air is then vented by the air vent 48 leaving behind a fluid free of entrained air which is returned to the pump circuit.

It should be noted that the above description of the tank 12 and the manner of directing incoming fluid into the tank 12 interior C is not exclusive. The inlet tubing 26 could, for instance, enter the tank 12 through the outlet side 20 or one of the sidewalls 22. Also, the domed-shaped top 14 could be replaced by a pyramidal or conical surface or a flat top having a plurality of converging and deepening slots to facilitate the collection of air bubbles.

INDUSTRIAL APPLICABILITY

The deaeration apparatus 10 is particularly useful in diesel fuel injection pump testing circuits. Air removal is important in that entrained or dissolved air gives erratic flow meter readings which, in turn, affect the ability to calibrate fuel injection equipment such as pumps and injectors.

A typical test circuit shown in FIG. 1 uses a circulating pump 11 having, for example, a discharge of approximately 5.62 Kg/cm$^2$ (80 PSIG) and the capacity is oversized with respect to the injector pump 13 demand by approximately 90%. The circulating pump 11 provides diesel fuel to the injector pump 13 to calibrate its operating characteristics. The 90% surplus fluid is recirculated through the deaerator apparatus 10.

The relief valve 52 opens to pass the 90% overcapacity. Due to the fluctuating demand of the injector pump 13, the relief valve 52 oscillates to accommodate the varying flow. As described above, these oscillations create negative pressure waves which, in turn, cause dissolved air to dissociate and combine to form bubbles of entrained air. The fluid with entrained air is then injected into the tank 12.

In the typical test circuit described above, the relief valve 52 generates the negative pressure waves which, in turn, generates the bubbles of entrained air. The tank 12 thereafter removes the bubbles of entrained air from the system by slowing the fluid from a velocity of about 25.4 cm/sec (10 in/sec) to about 4.2 cm/sec (1.65 in/sec) in the tank 12. The fluid, free of entrained air and reduced in dissolved air content, returns to the circuit for circulation thereof.

One benefit resulting from the circulation of fluid deaerated in the manner described above is that of repeatability of flow measurement tests. The density of the fluid in the circuit is not variant as a result of entrained and/or dissolved air but rather is constant from test to test. This constant density fluid not only provides for constant, repeatable flow measurements, but also enables the circulating pump to operate at a constant volumetric efficiency. An additional benefit is the protection of instruments and equipment in the circuit since the aforementioned deaeration prevents entrained and/or dissolved air from collecting to form slug flow patterns.

Other aspects, objects and advantages of this invention can be obtained from a study of the drawings, the disclosure and the appended claims.

We claim:

1. In a deaeration apparatus (10) for removing bubbles of gas from a fluid being circulated in a closed system, the improvement comprising:
    a circulating pump (11);
    closed tank means (12) for receiving and slowing the fluid containing gas, said tank means (12) having a fluid inlet (26) and a fluid outlet (42), said tank means (12) being filled with fluid to a level that covers said fluid inlet (26);
    means (46) for positively venting gas from a gas space above said fluid in said tank means (12);
    an injector pump (13) extracting a fluctuating amount of deaerated fluid from the closed system; and
    pressure regulating valve means (52) for continuously inducing negative pressure waves in said fluid, said pressure regulating valve means (52) being interposed between said circulating pump (11) and said tank fluid inlet (26) and being disposed adjacent to said fluid inlet in said tank means (12), said pressure regulating valve means (52) being subjected to fluctuating pressure output from said circulating pump (11) and from said injector pump (13) causing said valve means to throttle in attempting to maintain a constant pressure, said throttling of the valve means (52) inducing said negative pressure waves in said fluid, said negative pressure waves causing dissolved gas in the fluid passing through said pressure regulating valve means (52) to oversaturate to form bubbles of entrained gas, said bubbles of entrained gas being collected and positively vented from said tank means (12) through said vent means (46).

2. The deareation apparatus (10) of claim 1 wherein said venting means is a gas vent (46) communicating with the interior (C) of the tank means (12).

3. In the deaeration apparatus (10) of claim 1 wherein the improvement further comprises means (28,30) for splitting the flow of fluid entering said tank means (12) to further slow said fluid.

4. In a deaeration apparatus (10) for removing bubbles of gas from a fluid being circulated in a closed circuit, the improvement comprising:
    a circulating pump (11) in the circuit discharging fluid with a fluctuating pressure output;
    a closed tank (12) in the circuit having a fluid inlet (26) submerged below the surface of the fluid, and a fluid outlet (42), said tank (12) being substantially filled with fluid and receiving and slowing the flow of fluid containing said gas;
    means (46) for positively venting gas from above the surface of the fluid in said tank (12); and
    pressure regulating valve means (52) for receiving said fluctuating pressure output of said circulating pump (11) and continuously inducing negative pressure waves in said fluid, said pressure regulating valve means (52) being interposed between said circulating pump (11) and said tank fluid inlet (26), said negative pressure waves causing dissolved gas in the fluid passing through said pressure regulating valve means (52) to oversaturate to form bubbles of entrained gas, said fluid with the bubbles of entrained gas being slowed as it enters the tank (12) whereupon the bubbles of entrained gas are released into the space above the surface of the fluid, said bubbles of entrained gas being collected and positively vented from the space above the surface of the fluid in said tank (12) through said vent means (46).

5. The deaeration apparatus (10) of claim 4 wherein said valve means (52) is placed adjacent to said tank (12).

6. A deaeration apparatus (10) as claimed in claim 4 wherein said tank (12) has a dome-shaped top (14) and wherein said vent means (46) communicates with the high point of said top (14) for venting gas from said tank (12).

7. In a deaeration apparatus (10) to remove entrained gas from a fluid circulated by a pump (11), a closed pressurized tank (12) substantially filled with fluid and having disposed therein at least one baffle (32) to slow the fluid velocity, said tank (12) having an inlet side (18) with an inlet tubing (26) passing into the tank (12) through the upper portion of the inlet side (18), at least one nozzle (30) on said inlet tubing (26), which nozzle is submerged below the surface of the fluid for directing the flow of fluid entering the tank (12), said tank (12) having an outlet side (20) with an outlet tube (40) near the bottom thereof, and said tank (12) having a top (14) with a vent (46) extending therethrough and communicating with a gas space above the surface of the fluid to remove gas from said gas space, the improvement comprising:
    a pressure relief valve (52) interposed between said circulating pump (11) and said tank inlet tubing (26) and positioned adjacent to said tank (12), said pressure relief valve (52) continuously opening and closing in response to pressure variations emanating from the circulating pump (11) to create negative pressure waves in the fluid for transforming the dissolved gas in the fluid into bubbles of entrained gas, the tank (12) slowing the fluid and entrained gas to remove the bubbles of entrained gas from the fluid, said bubbles of entrained gas being collected in the gas space above the surface of the fluid in said tank (12) and being positively vented through said vent (46).

* * * * *